(12) United States Patent
Boyacigiller et al.

(10) Patent No.: US 10,089,590 B2
(45) Date of Patent: *Oct. 2, 2018

(54) CROSS-DOMAIN MULTI-ATTRIBUTE HASHED AND WEIGHTED DYNAMIC PROCESS PRIORITIZATION

(71) Applicant: International Business Machines Corporation, Armonk, NY (US)

(72) Inventors: Can P. Boyacigiller, Austin, TX (US); Swaminathan Chandrasekaran, Coppell, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 23 days.

This patent is subject to a terminal disclaimer.

(21) Appl. No.: 15/289,067

(22) Filed: Oct. 7, 2016

(65) Prior Publication Data

US 2017/0024675 A1    Jan. 26, 2017

Related U.S. Application Data

(63) Continuation of application No. 14/499,131, filed on Sep. 27, 2014, now Pat. No. 9,495,655.

(51) Int. Cl.
*G06F 9/44* (2018.01)
*G06Q 10/06* (2012.01)

(52) U.S. Cl.
CPC ..... *G06Q 10/06393* (2013.01); *G06Q 10/067* (2013.01); *G06Q 10/0633* (2013.01)

(58) Field of Classification Search
None
See application file for complete search history.

(56) References Cited

U.S. PATENT DOCUMENTS 6,976,257 B2    12/2005    Leymann et al.
8,768,766 B2    7/2014    Ellis et al.
(Continued)

FOREIGN PATENT DOCUMENTS

EP    1016998 A3    7/2000

OTHER PUBLICATIONS

United States Patent and Trademark Office, Office Action for U.S. Appl. No. 14/717,630, dated May 19, 2017, pp. 1-12, Alexandria, VA, USA.

(Continued)

*Primary Examiner* — Chuck Kendall
(74) *Attorney, Agent, or Firm* — Lee Law, PLLC; Christopher B. Lee

(57) ABSTRACT

In response to receipt of a process-level input request that is subject to business-level requirements, multiple sets of attributes are identified. The sets of attributes are each from one of multiple informational domains that represent processing factors associated with at least the process-level input request, contemporaneous infrastructure processing capabilities, and historical process performance of similar processes. The multiple sets of attributes from the multiple informational domains are hashed as a vector into an initial process prioritization. The attributes of the hashed vector of the multiple sets of attributes from the multiple informational domains are weighted in the initial process prioritization into a hashed-weighted resulting process prioritization. The process-level input request is assigned to a process category based upon the hashed-weighted resulting process prioritization.

7 Claims, 5 Drawing Sheets

(56) References Cited

U.S. PATENT DOCUMENTS

| | | | |
|---|---|---|---|
| 9,495,655 B2 * | 11/2016 | Boyacigiller | G06Q 10/0633 |
| 2002/0165745 A1 | 11/2002 | Greene et al. | |
| 2009/0099880 A1 | 4/2009 | Doyle et al. | |
| 2009/0138318 A1 | 5/2009 | Hawkins et al. | |
| 2010/0010953 A1 | 1/2010 | Meliksetian et al. | |
| 2016/0092803 A1 | 3/2016 | Boyacigiller et al. | |
| 2017/0024675 A1 * | 1/2017 | Boyacigiller | G06Q 10/0633 |

OTHER PUBLICATIONS

United States Patent and Trademark Office, Advisory Action for U.S. Appl. No. 14/717,630, dated Sep. 21, 2017, pp. 1-2, Alexandria, VA, USA.

IBM, List of IBM Patents or Patent Applications Treated as Related, Applicant Appendix, Oct. 7, 2016, pp. 1-2, the contents of which are incorporated herein by reference in their entirety.

United States Patent and Trademark Office, Office Action for U.S. Appl. No. 14/499,131, dated Jan. 6, 2016, pp. 1-18, Alexandria, VA, USA.

United States Patent and Trademark Office, Notice of Allowance for U.S. Appl. No. 14/499,131, dated Jul. 20, 2016, pp. 1-12, Alexandria, VA, USA.

United States Patent and Trademark Office, Office Action for U.S. Appl. No. 14/717,630, dated Jan. 26, 2016, pp. 1-17, Alexandria, VA, USA.

United States Patent and Trademark Office, Office Action for U.S. Appl. No. 14/717,630, dated Aug. 18, 2016, pp. 1-6, Alexandria, VA, USA.

United States Patent and Trademark Office, Office Action for U.S. Appl. No. 14/717,630, dated Nov. 3, 2017, pp. 1-6, Alexandria, VA, USA.

United States Patent and Trademark Office, Office Action for U.S. Appl. No. 14/717,630, dated Jan. 30, 2017, pp. 1-6, Alexandria, VA, USA.

\* cited by examiner

CROSS-DOMAIN MULTI-ATTRIBUTE HASHED AND WEIGHTED DYNAMIC PROCESS PRIORITIZATION

BACKGROUND

The present invention relates to process prioritization. More particularly, the present invention relates to cross-domain multi-attribute hashed and weighted dynamic process prioritization.

Business process management (BPM) and workflow management systems represent technologies that may be used to automate business processes. Static priorities may be assigned to different processes to reflect the relative importance of the respective processes. Input messages may be processed within the respective technologies according to the assigned static priorities.

SUMMARY

A method includes identifying, by a process prioritization processor in response to receipt of a process-level input request that is subject to business-level requirements, a plurality of sets of attributes each from one of multiple informational domains that represent processing factors associated with at least the process-level input request, contemporaneous infrastructure processing capabilities, and historical process performance of similar processes; hashing, as a vector, the plurality of sets of attributes from the multiple informational domains into an initial process prioritization; weighting attributes of the hashed vector of the plurality of sets of attributes from the multiple informational domains in the initial process prioritization into a hashed-weighted resulting process prioritization, where the hashed-weighted resulting process prioritization applies the business-level requirements to the process-level input request; and assigning the process-level input request to a process category based upon the hashed-weighted resulting process prioritization.

A system includes a memory; and a process prioritization processor programmed to: identify, within the memory in response to receipt of a process-level input request that is subject to business-level requirements, a plurality of sets of attributes each from one of multiple informational domains that represent processing factors associated with at least the process-level input request, contemporaneous infrastructure processing capabilities, and historical process performance of similar processes; hash, as a vector, the plurality of sets of attributes from the multiple informational domains into an initial process prioritization; weight attributes of the hashed vector of the plurality of sets of attributes from the multiple informational domains in the initial process prioritization into a hashed-weighted resulting process prioritization, where the hashed-weighted resulting process prioritization applies the business-level requirements to the process-level input request; and assign the process-level input request to a process category based upon the hashed-weighted resulting process prioritization.

A computer program product includes a computer readable storage medium having computer readable program code embodied therewith, where the computer readable program code when executed on a computer causes the computer to: identify, in response to receipt of a process-level input request that is subject to business-level requirements, a plurality of sets of attributes each from one of multiple informational domains that represent processing factors associated with at least the process-level input request, contemporaneous infrastructure processing capabilities, and historical process performance of similar processes; hash, as a vector, the plurality of sets of attributes from the multiple informational domains into an initial process prioritization; weight attributes of the hashed vector of the plurality of sets of attributes from the multiple informational domains in the initial process prioritization into a hashed-weighted resulting process prioritization, where the hashed-weighted resulting process prioritization applies the business-level requirements to the process-level input request; and assign the process-level input request to a process category based upon the hashed-weighted resulting process prioritization.

DETAILED DESCRIPTION

Figure 1:
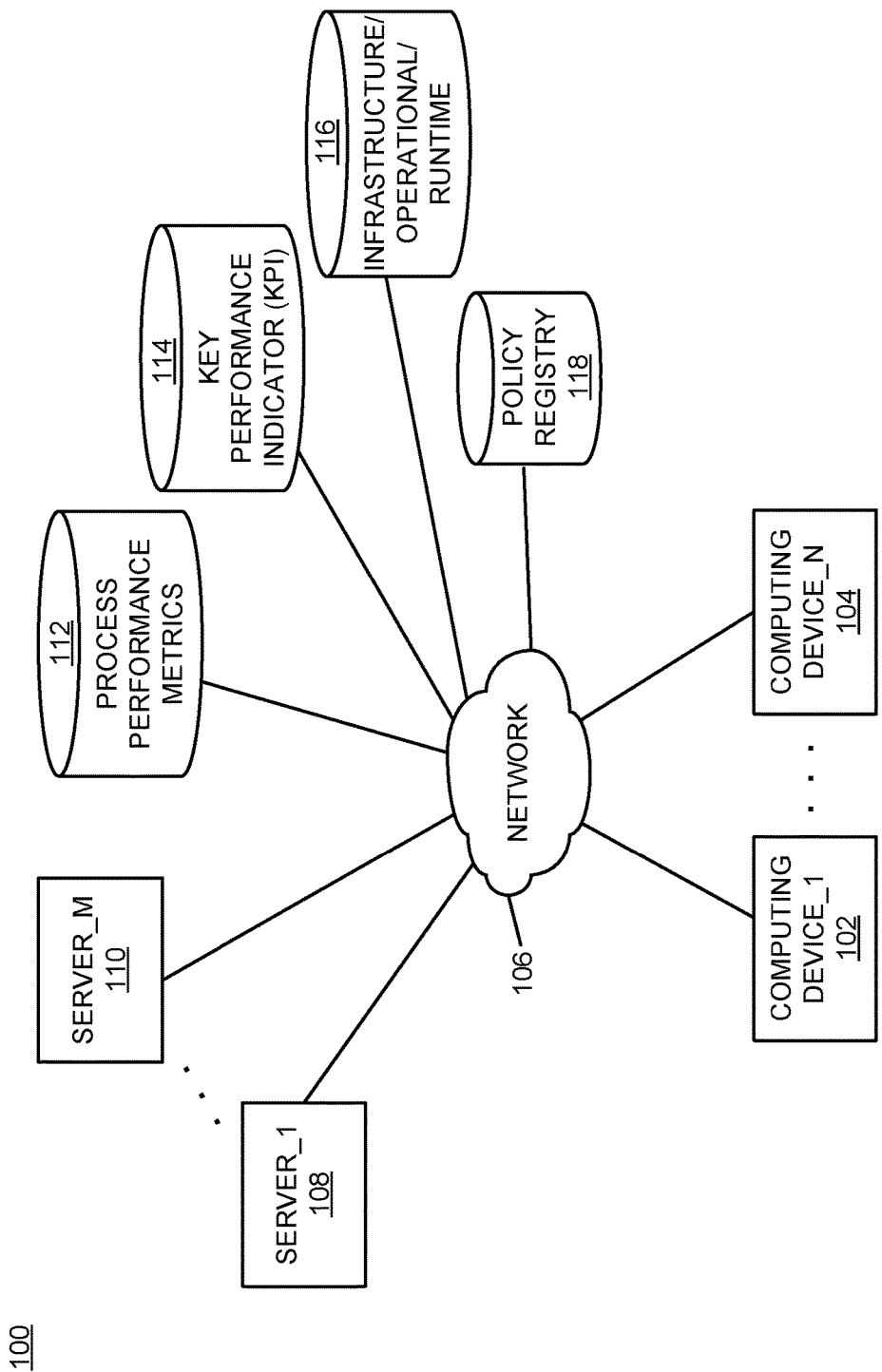
FIG. 1 is a block diagram and a process flow diagram of an example of an implementation of a process prioritization management system for cross-domain multi-attribute hashed and weighted dynamic process prioritization according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides cross-domain multi-attribute hashed and weighted dynamic process prioritization. The present technology derives and implements a higher-level business prioritization for lower-level input requests/messages. The higher-level business prioritization considers multiple business-level and real-time processing factors and/or informational domains (both past and current). A derived higher-level priority may be assigned to the lower-level requests and processes that are invoked to manage those requests. Accordingly, the present technology bridges across multiple informational domains to improve efficiency of prioritization and re-prioritization of the lower-level request processing based upon how these lower-level requests are relevant to and related to the higher-level business goals, as well as past/present processing similarities and capabilities of the execution platform.

It is understood that there is a difference between higher-level business process flows that represent business requirements (e.g., contractual or business obligations), and lower-level business processes and lower-level business process instances that are instantiated to carry out processing of input requests related to business requirements. The present technology operates to prioritize these lower-level business processing instances. The following description utilizes the terms "business process" and "business process instance" interchangeably to refer to these lower-level processing instances as these lower-level processing instances are distinguished from the higher-level business process requirements from which priorities for lower-level process instances as processed herein are derived.

As described herein, the present technology extracts attributes from the input request in combination with obtaining attributes related to business requirements/commitments, such as service level agreements (SLAs), operational/run-time data, prior/past process performance, key performance indicators (KPIs), and other informational domain attributes. Default weights are assigned to the multi-domain attributes to ensure that each attribute is weighted by default, and a default initial hashing of process prioritization is performed.

The initial hashing for process prioritization is based upon a foundational observation that business processes operate on a set of message payload attributes (provided as inputs that may number ten or more in quantity). The set of message payload attributes may be combined with other attributes from different informational domains to form a highly-dimensional data set that is hashed. The result of the hashed highly-dimensional data set may be used as input to perform a nearest neighbor search to locate a closest business process bucket (e.g., a container of similar processes) to process the message instance under consideration. Given hashed bits of a particular quantity of attributes (e.g., "k" attributes) of a business process that is under consideration, the present technology may identify the closest/nearest neighbor business process bucket name. Similar processes may be hashed to the same buckets to allow assignment of priorities and weighting probabilities to the process buckets. Utilization of buckets to process similar processes may improve efficiency because the multi-domain attributes of the respective different process instances have been determined to result in similar process priorities for the respective process instances in a given bucket, and the bucket of process instances may be managed for priorities and weighting as a set.

A trained set of hash tables may be provided, such that the hashed multi-dimensional bits may then be searched against the trained set of hash tables. The training data may include many parameters/values. For example, the training data may include, for a given business process, order handling, media transcoding, payroll processing, and other aspects of processing. Key attributes of these processes may be identified and used as training data. Additionally, a feature vector with the identified key attributes may then be constructed. The feature vector may then be hashed into the particular quantity of attributes (e.g., again "k" attributes).

The hashed bits may then be added to a multi-dimensional vector space that includes a particular quantity of hash tables (e.g., O(lN) of l hash tables) representative of the multi-dimensional character of the particular set of attributes. Many different business processes may be hashed and mapped to a point (e.g., a "bucket") in this multi-dimensional vector space.

An incoming business process instance may then be compared to the training data to determine how close the incoming business process instance is to any particular bucket (e.g., point) in the multi-dimensional training space (e.g., O(lN) of l hash tables). False negatives may be ignored to improve processing efficiency without a loss of accuracy with respect to the assignment of the incoming business process instance to a particular bucket.

Regarding the nearest-neighboring bucket processing, any suitable technique for identification of a nearest neighbor may be used as appropriate for a given implementation. For example, a nearest neighbor technique such as a "k-bit locality-sensitive hashing" algorithm may be utilized if appropriate for a given implementation to process the different multi-dimensional attributes from the input message and other informational domains, as described herein. The output may return the closest/nearest "process bucket name" from a set of existing process bucket names.

The following Table (1) provides an example of a subset of values that may be collected for several multi-dimensional attributes associated with a given business process instance.

TABLE 1

Example subset of multi-dimensional attributes values.

| Order Due Date | Product Name | Assured Response Time | CPU Utilization | Memory Utilization | Customer Priority | ... |
|---|---|---|---|---|---|---|
| May 1, 2014 | Message Transcoder | 24 Hours | 49% | 98% | HIGH | ... |

As can be seen from Table (1), the different multi-dimensional attributes have values with different data types derived from different information domains (e.g., business-level order processing, products, SLAs, performance metrics, etc.). As such, the multi-dimensional (e.g., "cross-domain") attributes and associated values may be collected into an array/vector (e.g., an array of ASCII characters or other data format), and hashed to determine a nearest neighbor bucket "name" for process priority. The process that is invoked/instantiated to fulfill this request will be associated with the identified nearest neighbor bucket "name" for process prioritization, as described in more detail below. As can be seen from the present example, the initial process prioritization may involve a complex multi-dimensional attribute set with data values of different data types from different informational domains ranging from business-level to process-level constraints.

The weighting function may take this vector of attribute values (e.g., the collection of cross-domain attributes) and hash them to "k-bits." The hashed "k-bits" may be searched for the nearest neighbor bucket in the multi-dimensional training space. It should be noted that weights may be assigned to the buckets and not to individual business process instances. Further, the weight may be assigned to the process bucket "name." Multiple business process instances may hash to the same bucket, and as such, may share the same weighting for process prioritization.

If the determined weight for a particular bucket already exists, a new process instance that gets hashed to that bucket inherits the weight assigned to the bucket. As such, for purposes of the present description, it is understood that weights are assigned to the buckets and not to an individual business process instance.

After default initial hashing of process prioritization is performed, attribute weighting may be adjusted or changed as certain attributes change over time. For example, certain attributes may be considered adjustable during the processing of an input request, such as attributes that are based upon the prior processing of "similar" types of input requests, or attributes that are related to the current/contemporaneous processor utilization/performance (e.g., CPU utilization, process priority, etc.). Alternatively, certain other attributes may be considered non-adjustable, such as business requirements/commitments (e.g., SLAs).

As such, and with respect to the attributes that are adjustable, over time the values exhibited by certain of the adjustable attributes that have been used to calculate the initial priority for the bucket may change (e.g., changes to CPU utilization, process priority, etc.). These changes may cause the weighting assigned to the process buckets to be updated as well. The process of updating the weight is similar to the process described above to determine the initial weighting. Any process instance that is in a bucket may be utilized to update the weighting for the bucket. Alternatively, the set of individual process instances within a bucket may each be evaluated to update the weighting of the bucket. As an additional alternative, process instances may be moved between buckets based upon the updated weightings as appropriate for a given implementation.

Attributes that are considered adjustable during processing of an input request may be selected from the full set of cross-domain attributes. The selected set of adjustable attributes may be processed further to have their weights dynamically adjusted over time using probabilities of interrelation of the respective attributes to form cross-domain weighted attributes. The cross-domain weighted attributes may then be normalized, and the initial hashing of the bucket prioritization may be adjusted by re-hashing the vector of cross-domain attributes as collectively adjusted by the dynamic weighting of the adjustable attributes (e.g., a different current CPU utilization relative to an initial CPU utilization, etc.). As such, the bucket priority may be adjusted by the re-hashing of the vector of weighted cross-domain attributes.

Processes may be routinely re-prioritized among other outstanding processes by re-weighting the respective attributes. Re-weighting the respective attributes may be based upon contemporaneous changes to the attribute interrelations, for example, to prevent starvation of processes that may initially be weighted lower than other processes. In this manner, SLAs and other business commitments may be maintained, while efficiently processing input requests in a dynamic and flexible manner.

Regarding dynamic weighting of attributes for process prioritization, the attribute weighting applied to individual input requests to a given business process or workflow may leverage current business requirements in conjunction with past performance of the respective processes/process types and may also leverage run-time infrastructure metrics (again, both past and current) to perform process prioritization and re-prioritization. Key business performance indicators, such as service level agreements (SLAs) and quality of service (QoS), among others, may be further leveraged into input request processing priorities.

As such, the present technology takes into account key data attributes from the process or workflow input, in addition to run-time information, while emphasizing the respective attributes and respective cross-domain contributions to process prioritization to establish and refine the order in which the business processes or workflows are designated to be executed. Accordingly, the present technology provides an approach to efficiently utilize the processing infrastructure to process multiple varied requests in a processing order/sequence that considers real-time complexities while maintaining the overall business requirements and concerns.

Regarding an initial attribute specification for an input request, the following forms of information, among others, may be identified and attributes may be specified in association with an input request to represent the various cross-domain informational elements. Information from the input message itself (e.g., business category) may be captured within attributes associated with the input request. Additionally, information regarding service level agreements (SLAs) and quality of service (QoS) may be captured as attributes. Additional attributes that may be captured for input request prioritization may include any of past performance of process/workflow and infrastructure, past and current performance of similar categories of business processes, current run-time/real-time infrastructure metrics, key performance indicators (KPIs) (e.g., higher-ranked indicators of processing performance), existing processing priorities, and data from different business rules that apply to the respective process that will be invoked to manage the input request. The respective set of cross-domain attributes may all be weighted and processed to establish and adjust process priorities over time, as described in more detail below.

For example, within a telecommunications implementation, example attributes may include an order due date, a product identifier (ID), a service delivery date, a customer rank (e.g., contractual processing tier/business priority), an order amount, a site location, and other information. Alternatively, within a media and entertainment implementation, example attributes may include a target channel, data encoding format, file size, and other information. Overall SLA commitments with respect to available processing time may include, for example, one or more contractual commitments (e.g., QoS, bandwidth, etc.) associated with a new request and respective contractual commitments associated with each other outstanding request. As such, the specific cross-domain attributes utilized may vary depending upon the particular input messages for the particular business process domain, in addition to the other domains and informational attributes (facets) described herein.

The weighting function calculates and updates a decision weight for each hashed value/vector, thereby placing an explicit prioritization on the respective request. Regarding operational/run-time data attributes, these attributes may include, for example, central processing unit (CPU) utilization, disk space, bandwidth utilization, and other operational information. Process performance metrics may include process information (e.g., historical information, and current performance information) for a current process that is invoked for a given request as well as for other processes that are executing to process other requests. Cumulative time waiting (e.g., cumulative wait time) may be evaluated for each outstanding request to re-prioritize the outstanding requests, and may be used to initially prioritize a new request relative to the outstanding requests.

As described above and in more detail below, the present technology utilizes computer-implemented deductive analytics to derive higher-level priority assignments and priority decisions for business process instances and the related workflow processing of the lower-level input requests. The priority assignments and priority decisions for the lower-level business processes may be derived by weighting multiple cross-domain attributes from the input requests/messages in combination with operational/run-time data and business process/workflow requirements across multiple informational input domains. The respective cross-domain attributes from the multiple informational domains may be assigned weights and the weighted attributes may be processed to derive priorities for the execution of the lower-level processes.

The output of the weighting function may be considered an adjusted hash value that is placed within an enhanced hash table that contains cross-domain key-value pairs. The "key" of the key-value pair represents a bucket key that identifies the respective bucket of the enhanced hash table. A "value" of the key-value pair represents the assigned process ID. An adjusted weighting value is associated with the key-value pair as calculated for each process. The key-value pairs may then be used by a business process management (BPM) or workflow runtime to select processes for execution across all active processes and requests.

It should be noted that, as described above, input attributes that exhibit similar values may be hashed to the same bucket/band of items for collective processing using similar priorities. For purposes of the present description, similarity of input attributes may be considered to be a result of attributes exhibiting similar values (e.g., similar order due date, similar target encoding type, etc.).

Further regarding the enhanced hash table, the enhanced hash table may be organized into an array of buckets/bands, where each band includes similarly prioritized processes/requests. Alternatively, other structures or forms of organization may be used, as appropriate for a given implementation.

Each bucket or band of the enhanced hash table may be assigned a unique priority within the array. Each bucket may contain one or more business processes/workflows with similar weights. The similarly-weighted processes that are assigned to the same buckets may then be processed with the same processing priority, until completed or re-prioritized. As such, the "bucketizing" or "bucketization" compartmentalizes similarly-situated processes to enhance and improve process execution.

Identification of similarities (e.g., business related, processing related, or other similarities) across processes and the bucketizing of processes with similar aggregated priorities may improve efficiency of processing prioritization and re-evaluation of priorities over time. For example, as new requests arrive for processing, the new requests may be evaluated and hashed by dynamic attribute weighting into an existing bucket with other currently executing processes. As such, the same processing priorities may be applied to existing currently executing processes/requests and to new processes/requests. Accordingly, rather than being merely placed at an end of a processing/request queue as with prior technologies, the present technology allows new requests to be assigned an appropriate priority based upon the cross-domain attributes and weighting associated with the particular process, and the processes may be executed based upon the assigned higher-level business priority.

It should additionally be noted that the priority assigned to processes may also be updated/adjusted in real time during process execution. As such, the order of long-lived processes may be altered based upon real-time data across multiple processes and multiple information domains. As such, when the cross-domain attribute weighting function processing of these variables determines that a given process should have the lower prioritization, the present technology may lower the assigned priority (e.g., change the bucket to which the process is assigned or the bucket priority), while ensuring that processing is timely completed to prevent process starvation.

For example, as an SLA time obligation gets closer to jeopardy of fallout (e.g., not meeting a contractual time commitment), the process prioritization may be progressively weighted higher over time based upon the time remaining in the SLA commitment. Accordingly, process priorities may be dynamically adjusted up or down in real-time and over time as appropriate for the respective business-level commitments. Many other variations on progressive re-prioritization are possible and all such variations are considered to be within the scope of the present technology.

The input messages may be formatted as an extensible markup language (XML) message, as a simple object access protocol (SOAP)/XML message, as a representational state transfer/Javascript® object notation (REST/JSON) message, as a Java™ message service/WebSphere® message queue (JMS/MQ) message, as a file, or may be formatted in any other manner appropriate for a particular implementation. As such, it is understood that the present technology may be implemented within a variety of systems/platforms, and that all such systems/platforms are considered to be within the scope of the present technology.

Regarding example calculations and updates of weights to adjust priorities of an input request process, the following examples provide a foundation from which calculation and assignment of weights may be performed. It should be understood that other forms of calculation and assignment of weights may be utilized, as appropriate for a given implementation, and that all such other forms of calculation and assignment of weights are considered within the scope of the present technology.

It is additionally understood that, as described above, the present technology analyzes multiple attributes from multiple informational domains. The following example is directed to the cross-domain multi-attribute weighting associated with the present technology.

To begin attribute weighting from the multiple informational domains, a request to start a business process instance may be received. The input request payload message (e.g., XML, or other format) may contain several attributes that represent the requisite information to start the business process instance, and may also specify the requisite information to take the processing of the input to competition.

The appropriate category of business process may be used to select a set of key attributes from the input message. The category of business process may be derived, for example, based upon the process name from the input message. Examples of business process categories may include order processing, billing inquiry processing, trouble ticket processing, and other categories as appropriate for a given implementation.

For the given process, attributes representing overall SLA commitments may be fetched for processing. SLA commitments may include, for example, a designated processing time, processing priority, elapsed time, and other SLA information. The SLA commitment information may be retrieved, for example, from a policy registry or other appropriate storage location.

At the point of receiving the process input request, attributes representing operational metrics (e.g., central processing unit (CPU) utilization, disk space, memory utilization, bandwidth utilization, etc.) may also be retrieved. The operational metrics may be retrieved, for example, from a server runtime that is hosting the business process runtime, from an infrastructure operational/runtime attributes database (DB), or otherwise as appropriate for a given implementation.

Attributes representing past process performance metrics (e.g., the past processing history for similar types of processes) may also be retrieved. The process performance metrics may be retrieved from the process runtime, from a process performance metrics DB, or otherwise as appropriate for a given implementation.

Attributes representing key performance indicators (KPIs) may additionally be retrieved. The KPIs may be considered attributes that are specific to a given business process and/or a category of business processes. Selection logic to identify KPIs may be deterministic based upon business rules. Alternatively, a business process repository may be augmented with metadata that identifies the key attributes. As such, KPIs may be granularly applied to individual attributes in a manner that is unique to each deployment of the present technology. For example, if a business category is "order processing," an order due date, customer rank, or other attribute may be considered a "key" performance attribute for which KPI metrics are more important. Further, if the business category is "trouble ticketing," then the ticket severity and customer rank may be selected as KPIs. This information may be stored within metadata for each category, such as by use of extensible markup language (XML), within a key performance indicator (KPI) database (DB).

Attributes representing cumulative time waiting of similar processes may also be retrieved to avoid starvation scenarios. As such, the process to weight new processing requests considers outstanding requests and cumulative time waiting of those outstanding requests.

Probability information, as described in more detail below, may define probabilities of particular attributes being in the respective databases at a particular time, and may also define probabilities of particular attributes being in one or more of the respective databases given that the particular attributes are in one or more of the other databases. The respective probabilities may be stored within local memory as initially configured and updated over time. Alternatively, the respective probabilities may be configured/updated and retrieved from the process performance metrics DB, the KPI DB, and/or the infrastructure/operational/runtime attributes DB, as described above and in more detail below, and as appropriate for a given implementation.

A process identifier (ID) (and thereby the process) for which input attributes are similar may then be hashed (mapped) to a respective bucket with an initial default weight of one (1), which indicates a default high (equal) probability for the respective attributes. As such, "similar" process IDs may be hashed and mapped to the same bucket. The criteria for similarity is described in more detail below, and may be based upon any available variables as appropriate for a given implementation.

It should be noted that default initial weighting allows attributes that do not match the respective weighting function rules to still be classified with a weight. As such, process starvation may be avoided for processes for which weighting function rules are undefined.

Attributes that represent the category of business process, in combination with cross-domain attributes that represent the overall service level agreement (SLA) commitments, the operational metrics, the past process performance metrics, and the cumulative time waiting of similar processes may also be assigned a default initial probability of one (1). The input request may be hashed and correlated/mapped into the respective process prioritization bucket with other processes that have similar processing constraints.

For purposes of the present example, "similarity" of processing constraints may be considered to be determined due to attributes exhibiting similar values (e.g., similar order due date, similar order completion time, similar promised/contractual completion time, etc.). Similarities may also be based upon overall service level agreement (SLA) commitments, the operational metrics, the past process performance metrics, and the cumulative time waiting.

The number of buckets and names of the respective buckets may depend on the types of business processes and categories in the respective system. As such, any granularity of buckets across a set of process priorities may be utilized as appropriate for a given type of business process and available categories of business process activities. A set of buckets may also be grouped into a band for multi-band granular control of priorities.

A bucket may further have sub-buckets/bands for finer grained control. As an example, if a configured number of processes (e.g., thirty (30), fifty (50), etc.) are getting mapped to one bucket, processing may be configured to map some of the processes to a sub-band to allow those processes to be further prioritized relative to the other processes. As such, each process is weighted individually, but may then be further categorized into similarities with other processes within the bucket. The hashed value provides a placement in a particular bucket, and its presence in a particular bucket is what gives the bucket the assigned prioritization. Accordingly, individual differences in the process activities and the resources the respective processes utilize may be further analyzed. Alternatively, process instances from multiple buckets may be executed without the additional runtime overhead of evaluating each process within a given bucket.

At this point in the present example, it can be seen that a cross-domain set of attributes may be specified in association with an input request to a business process. The specified set of input attributes represents information from multiple informational domains as described above, and collectively forms a basis upon which process priority may be evaluated.

Continuing with the present example, a targeted set of attributes to which to apply initial cross-domain attribute weighting may be selected among the full set of attributes associated with the input request. For example, the SLA and other business commitments may be considered fixed for the duration of business process instance execution. As such, these attributes may be omitted from the initial weighting to improve real-time performance of the cross-domain attribute weighting. Other attributes, such as attributes associated with the relevant process performance metrics, attributes associated with the KPI metrics, and attributes associated with the infrastructure/operational/runtime metrics may be selected for cross-domain attribute weighting.

For each selected initially default-weighted attribute, the respective attribute may then be evaluated against metrics that are appropriate for evaluation of the respective attribute. For example, using an infrastructure operational/run-time attributes database (DB), the respective attribute may be matched and associated with appropriate metrics that may be used to evaluate the respective attribute. Using a process performance metrics database (DB), the respective attribute may be matched and similar process performance history may be obtained. Using a key performance indicator (KPI) dictionary/DB, the respective attribute may be matched and associated KPI's may be obtained to further characterize the respective attribute (e.g., determine whether the attribute is a key performance indicator or a less relevant attribute). As described in more detail below, the KPIs represent the respective business-level SLAs and QoS obligation information that may be used to evaluate the respective attribute. As such, a set of informational domains are considered for each attribute, and information applicable to the respective attribute from the various informational domains is obtained for further processing.

The cross-domain weighting function may be invoked to assign an updated "decision weight" (e.g., a probability) for each attribute associated with a hashed process priority value. The updated decision weight replaces the default prioritization probability value (e.g., one (1)) with an explicit-weighted prioritization probability value for each respective attribute within a set of attributes represented by the hashed process priority value. It is understood that the probability value will be within a range between zero (0) and one (1), inclusive.

Cross-domain weight calculation and updating may be performed, for example, using techniques such as Bayes Theorem (as with the present example that continues further below). Alternatively, a machine learning model may be constructed using logistic regression, Bayesian multivariate linear regression, or other appropriate probabilistic forms of modeling. An approach such as this may utilize past process historical information from the weighting model that may be trained and that may become more accurate over time. The features that this machine learning model may use include process names, process categories, attributes from the input request, CPU utilization, disk space, memory utilization, assured SLAs, assured times to completion, customer priorities, customer locations, request dates/times, and other attributes, again as appropriate for the given implementation.

To further the example calculation and updating of weights using Bayes Theorem, a set of attributes may be selected that represent the information obtained from the respective informational domains that may be adjusted over time. Selected attributes specified from the input to the business process, again based upon the respective process category and priority, may be evaluated.

For purposes of the present example, a variable "T" represents an indicator that the attribute is present in the KPI dictionary/DB. The KPI dictionary/DB may be used to match and retrieve the associated/appropriate KPIs for the particular process/category.

Similarly, a variable "O" represents an indicator that the attribute is present in the operational/run-time DB. The operational/run-time DB may be used to match and retrieve the appropriate metrics for the particular current runtime characteristics.

Further, a variable "C" represents an indicator that the attribute is present in the process performance metrics DB. The process performance metrics DB may be used to match and retrieve similar process performance history.

With the assignment of the information obtained from the various informational domains to the respective variables, a computation may be performed to derive a resulting calculated updated weighting for each attribute. The resulting calculated updated weighting replaces the initial default weighting for all attributes that are processed, and thereby, the hashed process priority value may be updated.

Again, each attribute is assigned an initial/default weighting of one (1) to ensure that all available cross-domain attributes are weighted for process prioritization, after which the initial/default weighting may be replaced with a resulting calculated updated weight. The resulting calculated updated weight for each attribute may be computed, for example, using the following Equation (1). The following Equation (1) applies Bayes Theorem in an example of computer-implemented processing to derive attribute weightings that are meaningful within the respective implementation during run-time.

$$\text{Computed Attribute Weight} = (P(T) \times P(O|T))/(P(O)) + (P(T) \times P(C|T))/(P(C)) \quad \text{Equation (1):}$$

Using this computational application of Bayes Theorem, the computed weight results in a probability of the respective event given another event, or alternatively stated, the relationship between two probabilities A and B generically, and the conditional probabilities of A given B and B given A.

Applying this to the assigned variables as detailed above, the computed weight may be stated as summation of two calculations (e.g., "+" in Equation (1) above). The first of the two summed calculations (e.g., "$(P(T) \times P(O|T))/(P(O))$" in Equation (1) above) represents the probability that the attribute is present in the KPI dictionary/DB, multiplied by the probability that the attribute is present in the operational/run-time DB given that the attribute is present in the KPI dictionary/DB, with the resulting quantity divided by the probability that the attribute is present in the operational/run-time DB. The second of the two summed calculations (e.g., "$(P(T) \times P(C|T))/(P(C))$" in Equation (1) above) represents the probability that the attribute is present in the KPI dictionary/DB, multiplied by the probability that the attribute is present in the process performance metrics DB given that the attribute is present in the KPI dictionary/DB, with the resulting quantity divided by the probability that the attribute is present in the process performance metrics DB. As described above, the results of the two probabilistic calculations is summed within Equation (1) to calculate the respective Computed Attribute Weight for the given attribute. Again, this calculation is performed across each variable to derive a cross-domain multi-attribute weighting, and the respective hashed process priority value may be accordingly updated.

Regarding probability calculations, any form of probability calculation appropriate for a given implementation may be used. As described in more detail below, the respective probabilities may be initially configured for a given deployment. The attribute probabilities may then be updated routinely throughout the execution of process prioritization over time as the system learns distributions of attributes and the respective attribute interactions within the different databases.

It is recognized that these probability calculations may be time consuming on certain platforms. However, real-time calculation may be preferred over pre-calculated values because use of pre-calculated values may make the priority assignments stale and out of synchronization with the actual processing environment or business constraints.

To improve real-time processing for the calculations of the respective attribute probabilities, the Bayes Theorem calculation may be implemented in a manner to speed up execution using several techniques. For example, additional processing power may be added to reduce real-time processing load. Alternative, the KPI dictionary data may be loaded into memory (e.g., random access memory (RAM)) to reduce access time. As another alternative, operational data filters may be implemented to only represent/utilize a certain time window for calculation of attribute probabilities (e.g., the last four (4) weeks of data, or other time period). Additionally, a trained regression prediction machine learning model may be implemented to assign numerical weights.

With updated weightings calculated for each attribute from the multiple informational domains, the computed adjusted attribute weight for each attribute may be normalized across all attributes using Equation (2) below.

$$\text{Normalized Attribute Weight} = \text{Computed Attribute Weight} * (\text{Total \# of attributes selected}) / (\text{Total \# of attributes in the input message}) \quad \text{Equation (2):}$$

Using Equation (2), the probabilistic Computed Attribute Weight is multiplied by the total number (e.g., "#" in Equation (2) above) of attributes selected. The resulting quantity is divided by the total number of attributes in the input message. As such, each computed attribute weight may be adjusted in consideration of the sample set size of the attributes from the multiple informational domains.

With the normalized attribute weight of each attribute from the multiple informational domains calculated, the resulting attribute weights may be re-applied to a hashing function to obtain a process prioritization (e.g., the adjusted hashed process priority value). By deducing the priority to the business process or to the workflow processing by hashing multiple attributes from the input message (e.g., an XML message) in combination with operational/run-time data including past performance and assigned weights, process prioritization may be performed in real time with consideration of a normalized set of information that provides intelligent cross-domain computational decision making.

As described above, the final output of the weighting and normalization is a placement of the process within an enhanced hash table that contains the key-value pairs as a result of hashing input attributes discussed above and the weight assigned for each of the processes. As such, the enhanced hash table represents the normalized weighting of each category of the business process, in "combination with" the overall SLA commitments, the operational metrics, the past process performance metrics, and the cumulative time waiting of similar processes for which the input attributes are similarly correlated/mapped into the respective process prioritization buckets. The assigned prioritization may be adjusted over time by reapplying the calculations described above, such as in response to changes in real-time performance metrics for the given operational platform, approaching due dates, in association with process starvation potential, and other factors as appropriate for a given implementation and as described in more detail below.

This output may be used by the BPM or workflow runtime to prioritize process execution for the received (or re-prioritized) request/process. As discussed above, the hash table may also be organized into bands for multi-band granular control of priorities, with each band having a priority on its own.

It should be noted that conception of the present subject matter resulted from recognition of certain limitations associated with conventional business process prioritization. For example, it was observed that prioritization of processes using static business process prioritization fails to consider many dynamic run-time aspects of business process fulfillment. It was further observed that business process and workflow requests may be triggered when a customer/user or system submits a request, such as an order for a product or service, a workflow request, or a trouble ticket/report. Further, it was observed that conventional approaches to determining the relative priorities, and hence the relative order, in which these requests should be processed by the respective business process management (BPM) engine, have been either ad-hoc/laissez faire or performed using static techniques (e.g., using a static priority field value within the incoming request). It was further observed that there is no conventional technology by which to semantically understand across all outstanding requests the relative importance of a submitted request with respect to multiple data points across multiple information domains, such as attributes associated with the input payload/stream, attributes associated with outstanding/pending processing activities, and attributes associated with other variable factors (e.g., run-time performance metrics, historical processing information/performance, overall contractual obligations like multiple service level agreements (SLAs) and quality of service (QoS) commitments, cumulative pending time in processing, etc.). In view of these observations, it was determined that conventional technologies are not capable of considering a true request/process prioritization as it pertains to business requirements. It was further determined that a fundamental change to process prioritization was needed that supports analysis and consideration of multiple attributes (e.g., information "facets") from multiple information domains. It was further determined that new technology that considers request/business process prioritization as it pertains to business requirements should be based upon such a cross-domain multi-attribute analysis to provide dynamic real-time initial process invocation prioritization and to provide re-prioritization of pending process priorities based upon weighting of attributes/facets from multiple information domains. It was further determined that hashing of the attribute/facet weightings and calculation of an effective dynamic real-time initial process invocation prioritization and re-prioritization of pending process priorities may leverage information provided by the various informational domains. It was further determined that improved process prioritization efficiency may be obtained by hashing the attribute/facet weightings using an array of hierarchical process priority groupings (e.g., buckets) that each have a unique priority (e.g., "bucketization" of processes with similar priorities into hierarchical process priority categories).

The present technology improves business process prioritization by providing cross-domain multi-attribute hashed and weighted dynamic process prioritization, as described above and in more detail below. As such, improved business process prioritization may be obtained through use of the present technology.

The cross-domain multi-attribute hashed and weighted dynamic process prioritization described herein may be performed in real time to allow prompt initial dynamic prioritization and re-prioritization of processes using multiple attributes from multiple information domains. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram and a process flow diagram of an example of an implementation of a process prioritization management system 100 for cross-domain multi-attribute hashed and weighted dynamic process prioritization. A computing device_1 102 through a computing device_N 104 communicate via a network 106 with several other devices. The other devices include a server_1 108 through a server_M 110. The computing device_1 102 through the computing device_N 104 represent customers/users or systems that may submit requests for processing by one or more of the server_1 108 through the server_M 110. As such, the server_1 108 through the server_M 110 represent process and workflow management devices, such as business process management (BPM) and other workflow management servers and/or systems. The server_1 108 through the server_M 110 implement the cross-domain multi-attribute hashed and weighted dynamic process prioritization described herein.

As will be described in more detail below in association with FIG. 2 through FIG. 5, the server_1 108 through the server_M 110 may each provide automated cross-domain multi-attribute hashed and weighted dynamic process prioritization. During request prioritization, the server_1 108 through the server_M 110 access information stored within a process performance metrics database (DB) 112, a key performance indicator (KPI) DB 114, an infrastructure/operational/runtime DB 116, and a policy registry 118. As described above, the information stored within the respective databases 112-118 may be utilized by the server_1 108 through the server_M 110 for initial prioritization and for re-prioritization of requests, and thereby the processes that are instantiated/invoked to process the requests. As also described above, the processing to perform the cross-domain multi-attribute hashed and weighted dynamic process prioritization utilizes bucketization of sets of similar requests to improve real-time efficiency of prioritized request processing.

It should be noted that while the server_1 108 through the server_M 110 are described herein to provide the cross-domain multi-attribute hashed and weighted dynamic process prioritization for purposes of example and description, the technology described herein may also be provided by the computing device_1 102 through the computing device_N 104, as appropriate for the given implementation. As such, the present technology may be implemented at a user computing device or server device level. A variety of possibilities exist for implementation of the present subject matter, and all such possibilities are considered within the scope of the present subject matter.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The process performance metrics database (DB) 112, the key performance indicator (KPI) DB 114, the infrastructure/operational/runtime DB 116, and the policy registry 118 may each include a relational database, an object database, or any other storage type of device. As such, the databases 112-118 may be implemented as appropriate for a given implementation.

Figure 2:
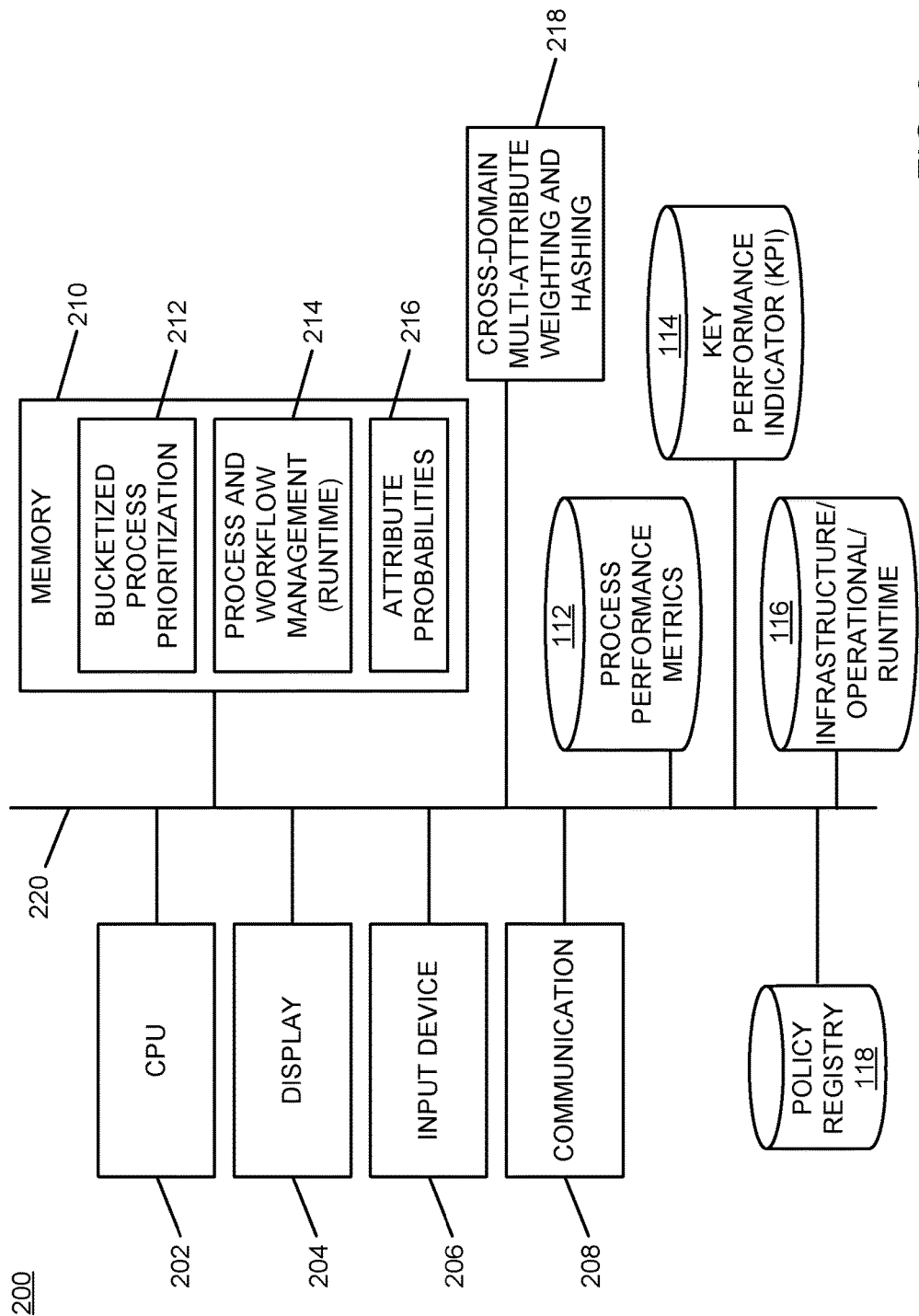
FIG. 2 is a block diagram of an example of an implementation of a core processing module capable of performing cross-domain multi-attribute hashed and weighted dynamic process prioritization according to an embodiment of the present subject matter.

FIG. 2 is a block diagram of an example of an implementation of a core processing module 200 capable of performing cross-domain multi-attribute hashed and weighted dynamic process prioritization. The core processing module 200 may be associated with either the server_1 108 through the server_M 110 or with the computing device_1 102 through the computing device_N 104, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of cross-domain multi-attribute hashed and weighted dynamic process prioritization in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides interconnection capabilities that allow the core processing module 200 to communicate with other modules within the process prioritization management system 100. The communication module 208 may include any electrical, protocol, and protocol conversion capabilities useable to provide interconnection capabilities, appropriate for a given implementation.

A memory 210 includes a bucketized process prioritization storage area 212 that stores a set of process priority buckets into each of which prioritized processes of similar characteristics may be prioritized for process execution, as described above and in more detail below. The memory 210 also includes a process and workflow management (runtime) area 214 that provides storage and execution space (e.g., a runtime environment) for one or more business process management (BPM) or other workflow management systems in association with the core processing module 200. As will be described in more detail below, the process(es) executing within the process and workflow management (runtime) area 214 may utilize the process priorities assigned to the set of process priority buckets stored in the bucketized process prioritization storage area 212 to efficiently select the highest-priority processes for execution.

The memory 210 additionally includes an attribute probabilities area 216. The attribute probabilities area 216 stores and provides processing space for analysis of attribute probabilities. It should be understood that the attribute probabilities may be initially configured for a given deployment, though the attribute probabilities may be dynamically updated routinely throughout execution of process prioritization over time as the system learns distributions of attributes and the respective attribute interactions within the different databases. The attribute probability information may define probabilities of particular attributes being in the respective databases at a particular time, and may also define probabilities of particular attributes being in one or more of the respective databases given that the particular attributes are in one or more of the other databases. As such, where Bayes Theorem or a machine learning model are utilized to perform the weighting described above and in more detail below, the respective probabilities may be obtained and also represented as attributes for efficient real-time access and processing. Additionally, the respective attributes may be updated over time. As such, the attribute probabilities used for dynamic weighting of process prioritization may be routinely updated and augmented as processing of input requests is enhanced over time.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A cross-domain multi-attribute weighting and hashing module 218 is also illustrated. The cross-domain multi-attribute weighting and hashing module 218 provides dynamic real-time initial prioritization and re-prioritization of requests/processes for execution by the process(es) executing within the process and workflow management area 214, as described above and in more detail below. The cross-domain multi-attribute weighting and hashing module 218 implements the automated cross-domain multi-attribute hashed and weighted dynamic process prioritization of the core processing module 200.

It should also be noted that the cross-domain multi-attribute weighting and hashing module 218 may form a portion of other circuitry described without departure from the scope of the present subject matter. Further, the cross-domain multi-attribute weighting and hashing module 218 may alternatively be implemented as an application stored within the memory 210. In such an implementation, the cross-domain multi-attribute weighting and hashing module 218 may include instructions executed by the CPU 202 for performing the functionality described herein. The CPU 202 may execute these instructions to provide the processing capabilities described above and in more detail below for the core processing module 200. The cross-domain multi-attribute weighting and hashing module 218 may form a portion of an interrupt service routine (ISR), a portion of an operating system, a portion of a browser application, or a portion of a separate application without departure from the scope of the present subject matter.

The process performance metrics database (DB) 112, the key performance indicator (KPI) DB 114, the infrastructure/operational/runtime DB 116, and the policy registry 118 are also shown associated with the core processing module 200 within FIG. 2 to show that process performance metrics database (DB) 112, the key performance indicator (KPI) DB 114, the infrastructure/operational/runtime DB 116, and the policy registry 118 may each be coupled to the core processing module 200 without requiring external connectivity, such as via the network 106.

The CPU 202, the display 204, the input device 206, the communication module 208, the memory 210, the cross-domain multi-attribute weighting and hashing module 218, the process performance metrics database (DB) 112, the key performance indicator (KPI) DB 114, the infrastructure/operational/runtime DB 116, and the policy registry 118 are interconnected via an interconnection 220. The interconnection 220 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the respective databases in FIG. 2 are illustrated as separate components for purposes of example, the information stored within the process performance metrics database (DB) 112, the key performance indicator (KPI) DB 114, the infrastructure/operational/runtime DB 116, and the policy registry 118 may also/alternatively be stored within the memory 210 without departure from the scope of the present subject matter. Accordingly, the core processing module 200 may take many forms and may be associated with many platforms.

Figure 3:
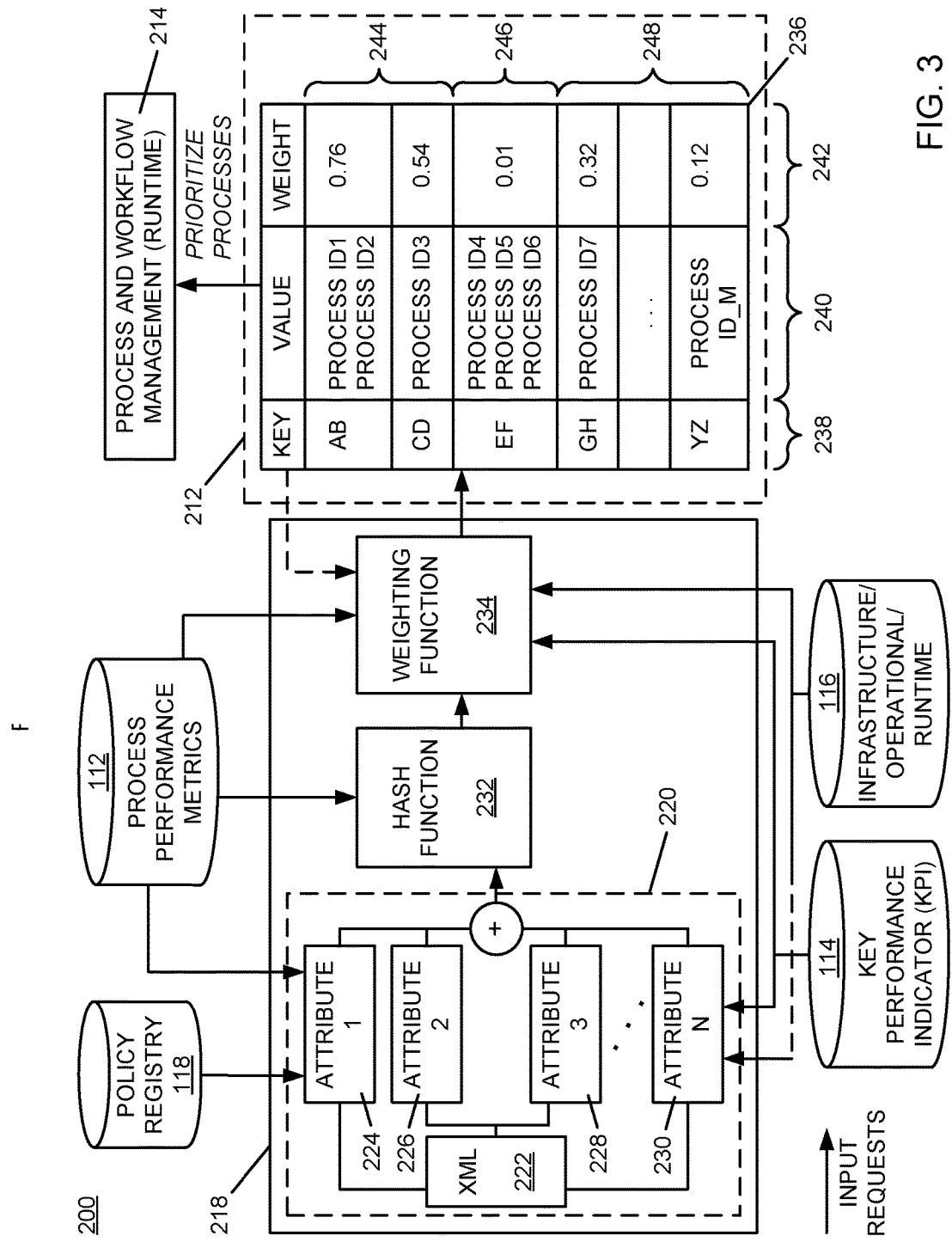
FIG. 3 is a block diagram and is a concurrent process flow diagram of an example of the implementation of the core processing module of FIG. 2 in more detail to illustrate additional features of a cross-domain multi-attribute weighting and hashing module and a bucketized process prioritization storage area for performing cross-domain multi-attribute hashed and weighted dynamic process prioritization according to an embodiment of the present subject matter.

FIG. 3 is a block diagram and is a concurrent process flow diagram of the example implementation of the core processing module 200 of FIG. 2 in more detail to illustrate additional features of the cross-domain multi-attribute weighting and hashing module 218 and the bucketized process prioritization storage area 212 for performing cross-domain multi-attribute hashed and weighted dynamic process prioritization. As such, FIG. 3 represents both a block architectural representation and a flow chart of processing activities performed by the respective components. As can be seen from FIG. 3, the cross-domain multi-attribute weighting and hashing module 218 and the bucketized process prioritization storage area 212 of the memory 210 are illustrated in more detail. As can also be seen from FIG. 3, the process and workflow management (runtime) area 214 of the memory 210, the process performance metrics database (DB) 112, the key performance indicator (KPI) DB 114, the infrastructure/operational/runtime DB 116, and the policy registry 118 are also illustrated.

The cross-domain multi-attribute weighting and hashing module 218 is shown within FIG. 3 to include an input message processing and attribute identification module 220. The input message processing and attribute identification module 220 includes an extensible markup language (XML) message processing module 222 that receives serialized input request messages (e.g., as represented by the arrow at the bottom of FIG. 3 due to space limitations in the drawing figure). The XML message processing module 222 parses the serialized input request messages, and identifies a set of input message attributes to use as a basis for cross-domain multi-attribute hashed and weighted dynamic process prioritization of the request. The set of input message attributes may include, for example, business category information as described above. The input message processing and attribute identification module 220 also accesses information stored within the process performance metrics database (DB) 112, the key performance indicator (KPI) DB 114, the infrastructure/operational/runtime DB 116, and the policy registry 118 to identify additional cross-domain attributes that are associated with the input request.

An attribute_1 224, an attribute_2 226, and attribute_3 228, through an attribute_N 230 are illustrated to have been derived and/or extracted from the input message, and obtained from the databases 112-118. As described above, the input message attributes represent at least the category of business process, and other attributes passed with the input message. Additionally, any applicable SLA commitments associated with the input request may be obtained from the policy registry 118. Additionally, each of the process performance metrics database (DB) 112, the key performance indicator (KPI) DB 114, and the infrastructure/operational/runtime DB 116 may be accessed to obtain attributes from the respective informational domains.

It should additionally be noted that, though the attribute probabilities area 216 of the memory 210 is described above for storage and processing of attribute probabilities, the process performance metrics database (DB) 112, the key performance indicator (KPI) DB 114, and the infrastructure/operational/runtime DB 116 may alternatively store the attribute probability information, as described above and in more detail below. As such, the respective databases themselves may perform real-time processing to derive attribute probability values, and may update these probability values over time.

The input message processing and attribute identification module 220 also assigns a default weighting of one (1) to each attribute to ensure that each attribute has an assigned weighting. As also described above, the weighting of individual attributes in combination with other attributes obtained from the process performance metrics database (DB) 112, the key performance indicator (KPI) DB 114, the infrastructure/operational/runtime DB 116, and the policy registry 118 may be adjusted during initial prioritization and/or over time during re-prioritization of process priorities.

A hash function module 232 applies a hashing function to the set of attributes 224-230 in consideration of past performance metrics obtained from the process performance metrics database (DB) 112 for "similar" processes of the same category of business process and the same respective SLA commitments. The output of the hash function module 232 is a preliminary hashing of the process priority for the input request. For purposes of the present example, the hashed value of the process priority for the input request may be considered a numeral between zero (0) and one (1) that specifies an initial priority. However, any form of hashing and values for process prioritization may be used as appropriate for the given implementation.

A weighting function module 234 applies the obtained probabilities related to the respective attributes obtained from the process performance metrics database (DB) 112, from the key performance indicator (KPI) DB 114, and from the infrastructure/operational/runtime DB 116. As such, the weighting function module 234 utilizes probabilities associated with the past performance metric attributes, key performance indicator attributes, and infrastructure/operational/runtime attributes to enhance/adjust the hashed priority of the input request.

The weighting function module 234 utilizes the probability attributes obtained from each of the process performance metrics database (DB) 112, the key performance indicator (KPI) DB 114, and the infrastructure/operational/runtime DB 116 to further evaluate the additional domains of information that are relevant (e.g., key performance indicators) to processing the input request.

The weighting function module 234 then applies a complex weighting to the initial hashing of input request attributes in combination with the cross-domain attributes identified as relevant to the input request. As described above, the complex weighting function may include a real-time computed application of Bayes Theorem or other form of weighting function that utilizes the respective probabilities to derive a complex probabilistic weighting adjustment of process priority.

The output of the weighting function module 234 is an enhanced hash table 236 that is stored within the bucketized process prioritization storage area 212. As described above, the real-time processing of the input attributes and the additional cross-domain attributes result in an attribute weight adjustment for each attribute. The attributes are then normalized, as also described above. Processes with resulting attribute weights that exhibit similar normalized values are hashed to the same bucket/band of processes. Similarities between attributes may be due to attributes exhibiting similar values (e.g., similar order due date, similar target encoding type, etc.).

The enhanced hash table 236 is then organized into an array of buckets, with each bucket having a priority on its own. Each bucket may contain one or more business processes or workflows with similar weights, which represents an equivalence of processing priority.

The enhanced hash table 236 contains key-value pairs and associated assigned cross-domain weights. A key column 238 of the enhanced hash table 236 includes a bucket key that identifies the respective bucket. A value column 240 of the enhanced hash table 236 includes the assigned process ID. A weight column 242 of the enhanced hash table 236 includes the calculated weight for each process.

The cross-domain multi-attribute weighting and hashing module 218 instantiates a process to perform the input request and assigns a process identifier (ID) to the instantiated process. The weighting function module 234 of the cross-domain multi-attribute weighting and hashing module 218 assigns the process priority weight and assigns the instantiated process to the respective processing priority bucket.

As can be seen from FIG. 3, several priority processing buckets are represented and labeled within the key column 238. For purposes of the present example, the buckets have alphabetical keys (e.g., AB, CD, EF, GH, through YZ). It should be understood that any form of identification of buckets within the enhanced hash table 236 may be used as appropriate for the given implementation.

The bucket "AB" includes processes with process identifiers "ID1" and "ID2." Computation of cross-domain attribute weights for each of the processes "ID1" and "ID2" results in a process priority weight of zero and seventy-six hundredths (0.76), and these two processes are bucketized into the bucket "AB." Similarly, other processes with different process IDs but similar cross-domain attribute weight computations are bucketized together for processing. The respective process ID values for the processes included within each of the buckets are illustrated within the value column 240. Further, the respective process priority weights for the buckets are illustrated within the weight column 242.

As described above, any granularity of buckets across a set of process priorities as appropriate for a given type of business process and available categories of business process activities may be used. A set of buckets may also be grouped into a band for multi-band granular control of priorities. As can be seen from FIG. 3, several additional subsets of buckets of the array of buckets are identified as being grouped/banded together to enhance real-time processing and selection of prioritized processes. A bucket band 244, a bucket band 246 (with only one bucket at the current point in time of the present example), and a bucket band 248 are illustrated. As such, the enhanced hash table 236 is illustrated to also be organized into bands for multi-band granular control of priorities, with each band having a collective processing priority. The banding of buckets into sets allows higher-level control of process priorities in consideration of the calculated weighting of processes in the respective individual buckets that form a given band/subset.

This enhanced hash table 236 may then be used by the one or more business process management (BPM) or other workflow management systems executing within the process and workflow management (runtime) area 214 to prioritize the process execution. As described above, the weighting function may be reapplied over time to re-prioritize outstanding processes, such as to prevent process starvation, as appropriate for the given implementation. This form of iterative process prioritization is illustrated with the dashed arrow that returns to the weighting function module 234 from the enhanced hash table 236. As such, both initial and ongoing process prioritization and re-prioritization may be performed in real time as new requests are received or this processing may be performed routinely or as scheduled, as appropriate for the given implementation.

Figure 4:
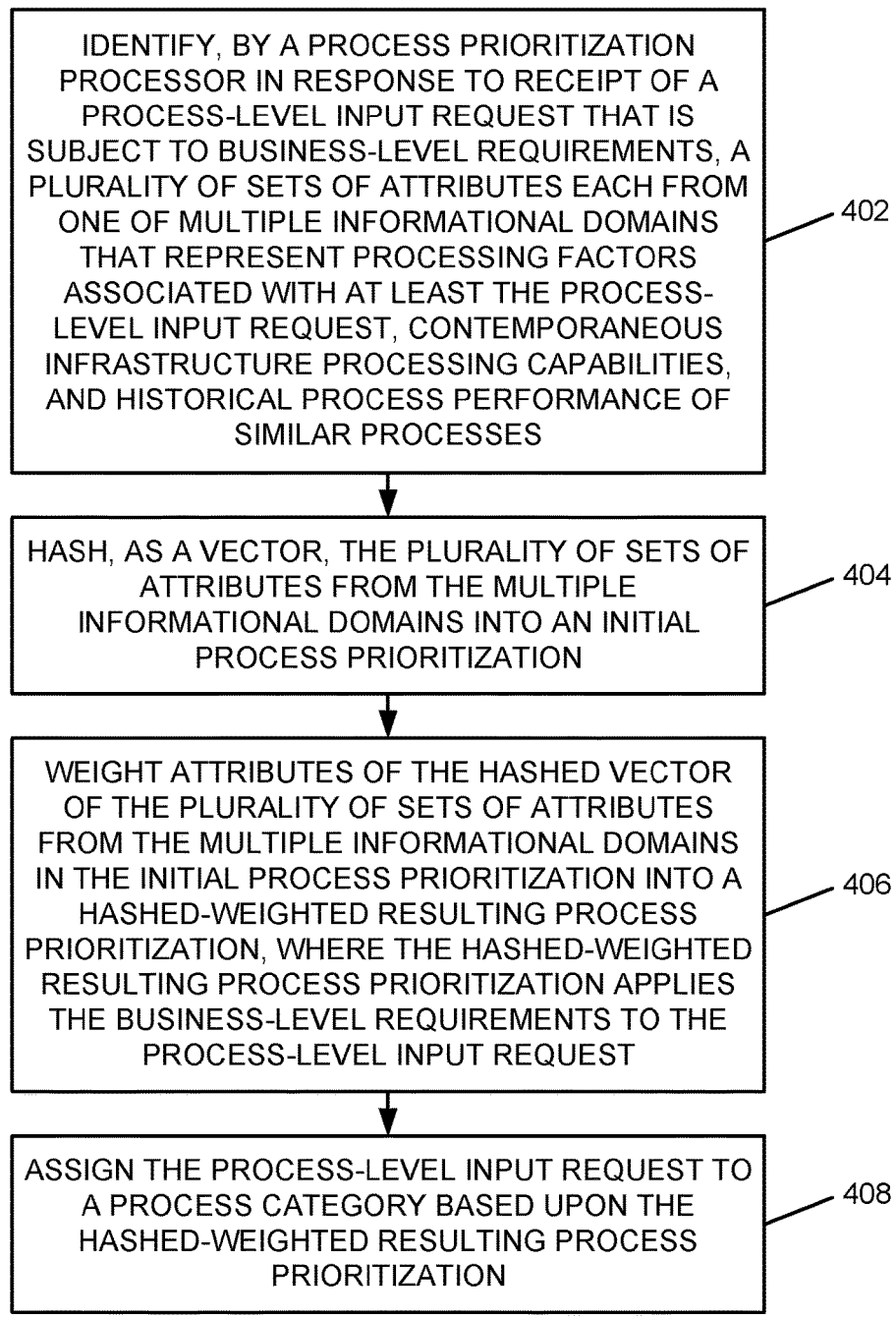
FIG. 4 is a flow chart of an example of an implementation of a process for cross-domain multi-attribute hashed and weighted dynamic process prioritization according to an embodiment of the present subject matter.
Figure 5:
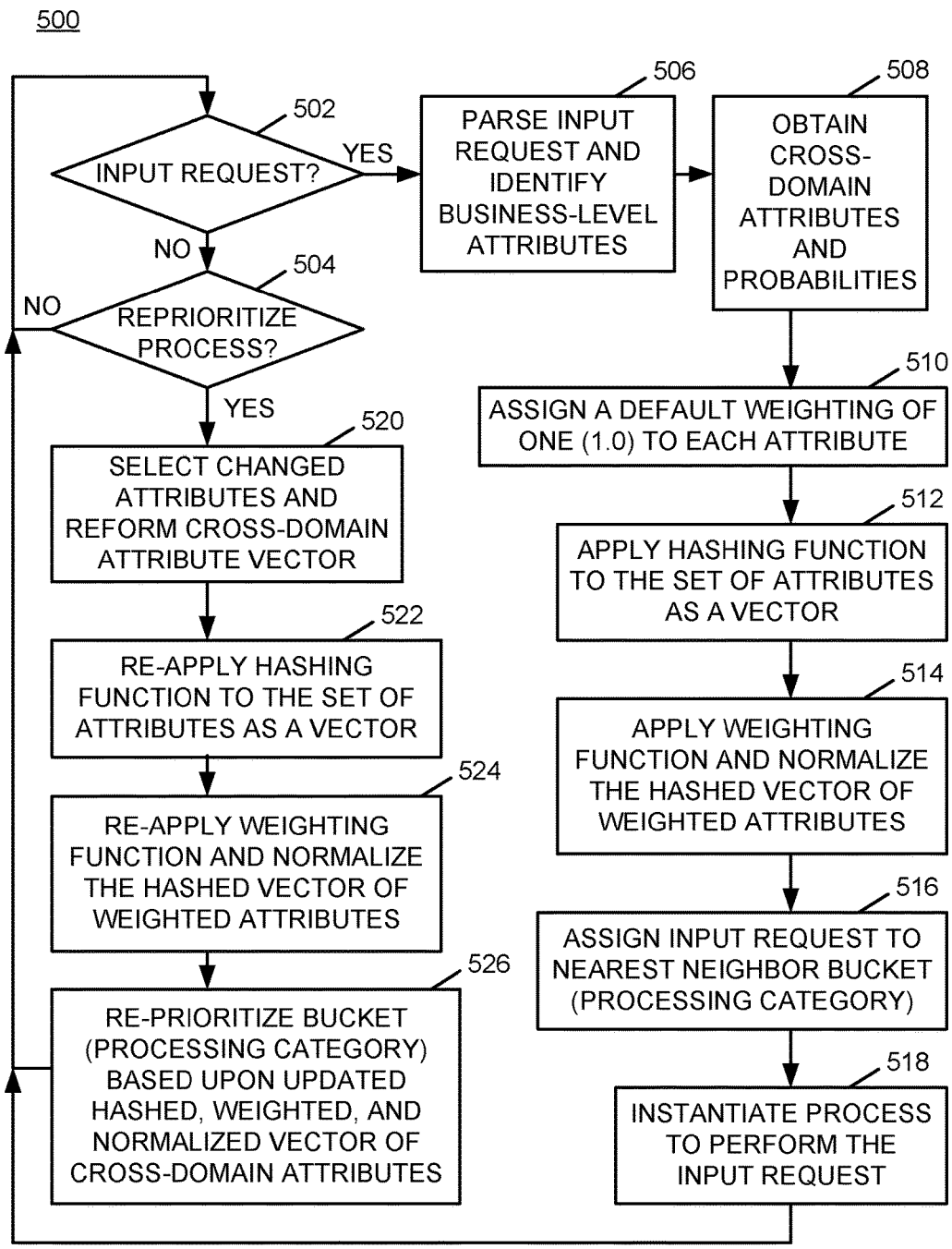
FIG. 5 is a flow chart of an example of an implementation of a process for cross-domain multi-attribute hashed and weighted dynamic process prioritization and re-prioritization according to an embodiment of the present subject matter.

FIG. 4 through FIG. 5 described below represent example processes that may be executed by devices, such as the core processing module 200, to perform the automated cross-domain multi-attribute hashed and weighted dynamic process prioritization associated with the present subject matter. Many other variations on the example processes are possible and all are considered within the scope of the present subject matter. The example processes may be performed by modules, such as the cross-domain multi-attribute weighting and hashing module 218 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 4 is a flow chart of an example of an implementation of a process 400 for cross-domain multi-attribute hashed and weighted dynamic process prioritization. At block 402, the process 400 identifies, by a process prioritization processor in response to receipt of a process-level input request that is subject to business-level requirements, a plurality of sets of attributes each from one of multiple informational domains that represent processing factors associated with at least the process-level input request, contemporaneous infrastructure processing capabilities, and historical process performance of similar processes. At block 404, the process 400 hashes, as a vector, the plurality of sets of attributes from the multiple informational domains into an initial process prioritization. At block 406, the process 400 weights attributes of the hashed vector of the plurality of sets of attributes from the multiple informational domains in the initial process prioritization into a hashed-weighted resulting process prioritization, where the hashed-weighted resulting process prioritization applies the business-level requirements to the process-level input request. At block 408, the process 400 assigns the process-level input request to a process category based upon the hashed-weighted resulting process prioritization.

FIG. 5 is a flow chart of an example of an implementation of a process 500 for cross-domain multi-attribute hashed and weighted dynamic process prioritization and re-prioritization. At block 502, the process 500 begins higher-level iterative processing, and makes a determination as to whether an input request has been received. In response to determining that an input request has not been received, the process 500 makes a determination at decision point 504 as to whether to reprioritize any existing process(es) (e.g., buckets/categories). In response to determining not to reprioritize any existing process(es), the process 500 returns to decision point 502 and iterates as described above.

Returning to the description of decision point 502, and as described above, an input request may be considered a process-level input request/message that is subject to business-level requirements. The business-level requirements may include at least one of a service level agreement (SLA), a quality of service (QoS), and other business-level requirements associated with processing of the process-level input request. As such, in response to determining that an input request has been received, the process 500 parses the input request and identifies business-level attributes that specify the business-level requirements of the input request at block 506.

At block 508, the process 500 obtains cross-domain attributes and probabilities. As described above, the cross-domain attributes may include multiple sets of attributes each from one of multiple informational domains that represent processing factors associated with at least the process-level input request, contemporaneous infrastructure processing capabilities, and historical process performance of similar processes. Processing factors associated with the process-level input request may include attributes obtained from the process-level input request selected from a group consisting of, for example, an order due date, a product identifier, a service delivery date, a customer rank, an order amount, a site location, a target channel, a data encoding format, and a file size. Processing factors associated with the historical process performance of similar processes may include historical processing information selected from a group consisting of, for example, the past performance of the process/workflow, the past performance of the processing infrastructure, runtime infrastructure metrics, and key performance indicators (KPIs). The probabilities represent the probabilities of interrelationships between the respective attributes within the respective databases described above.

At block 510, the process 500 assigns a default weighing of one (1.0) to each attribute. The default weighing is utilized to distribute the attributes evenly prior to additional processing, and to avoid non-weighted attributes if any of the respective attributes are not calculated/updated by additional processing.

At block 512, the process 500 applies a hashing function to the set of cross-domain attributes as a vector. At block 514, the process 500 applies a weighting function to and normalizes the hashed vector of the weighted attributes. At block 516, the process 500 assigns the input request to the nearest neighboring bucket (processing category) based upon the result of the hashed, weighted, and normalized vector of cross-domain attributes. The process 500 may identify at least one additional currently-in-process process-level input request that was evaluated to have a similar hashed-weighted resulting process prioritization. The process 500 may place the process-level input request into an active process category associated with the currently-in-process process-level input request.

At block 518, the process 500 instantiates a process to execute and performs the input request processing at the assigned priority within the processing category. The process 500 returns to decision point 502 and iterates as described above.

Returning to the description of decision point 504, it should be noted that the cross-domain attributes may include a combination of fixed business-level service agreement attributes (e.g., SLA, QoS, etc.) and adjustable real-time infrastructure processing capability attributes (e.g., CPU occupancy/utilization change, etc). As such, the process 500 evaluates real-time performance of processing of the process-level input request relative to the fixed business-level service agreement attributes, and in consideration of changes to platform processing capabilities. Reprioritization may be performed in response to changes to a variety of processing factors/events related the adjustable real-time infrastructure processing capability attributes, such as a change to the real-time performance of request processing, an approaching due date for a process, to avoid process starvation, or a number of other real-time business-level and/or processing-level factors. The process 500 may increase, as part of process starvation prevention, the hashed-weighted resulting process prioritization in response to a reduced time remaining to fulfill at least one business-level requirement defined within one or more of the fixed business-level service agreement attributes.

As such, in response to determining at decision point 504 to reprioritize any existing process(es) (e.g., buckets), the process 500 selects any attributes that have changed since the previous priority assignment, and reforms the vector of cross-domain attributes at block 520. At block 522, the process 500 re-applies the hashing function to the set of cross-domain attributes as a vector. At block 524, the process 500 re-applies a weighting function to and normalizes the re-hashed vector of the weighted attributes. At block 526, the process 500 re-prioritizes the bucket (processing category) based upon the updated hashed, weighted, and normalized vector of cross-domain attributes. The process 500 returns to decision point 502 and iterates as described above.

As such, the process 500 performs cross-domain multi-attribute hashed and weighted dynamic process prioritization and re-prioritization of input requests in real time. The process 500 iteratively and continually adjusts priorities of processes instantiated to perform input requests with consideration of the adjustable real-time infrastructure processing capability attributes. The process 500 considers cross-domain attributes from infrastructure-level real-time demand-based attributes up through an attribute hierarchy to and including business-level requirements associated with the respective input requests.

As described above in association with FIG. 1 through FIG. 5, the example systems and processes provide cross-domain multi-attribute hashed and weighted dynamic process prioritization. Many other variations and additional activities associated with cross-domain multi-attribute hashed and weighted dynamic process prioritization are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A method, comprising:
    identifying, by a process prioritization processor in response to receipt of a process-level input request that is subject to business-level requirements, a plurality of sets of attributes each from one of multiple informational domains that represent processing factors associated with at least the process-level input request, contemporaneous infrastructure processing capabilities, and historical process performance of similar processes;

hashing, as a vector, the plurality of sets of attributes from the multiple informational domains into an initial process prioritization;

weighting attributes of the hashed vector of the plurality of sets of attributes from the multiple informational domains in the initial process prioritization into a hashed-weighted resulting process prioritization, where the hashed-weighted resulting process prioritization applies the business-level requirements to the process-level input request; and assigning the process-level input request to a process category based upon the hashed-weighted resulting process prioritization.

2. The method of claim 1, where the business-level requirements comprise at least one of a service level agreement (SLA) and a quality of service (QoS) associated with processing of the process-level input request.

3. The method of claim 1, where:

the plurality of the sets of attributes from the multiple informational domains represent fixed business-level service agreement attributes and adjustable real-time infrastructure processing capability attributes; and further comprising adjusting the hashed-weighted resulting process prioritization in response to a change to at least one of the adjustable real-time infrastructure processing capability attributes.

4. The method of claim 3, further comprising:

evaluating real-time performance of processing of the process-level input request relative to the fixed business-level service agreement attributes; and increasing, as part of process starvation prevention, the hashed-weighted resulting process prioritization in response to a reduced time remaining to fulfill at least one business-level requirement defined within at least one of the fixed business-level service agreement attributes.

5. The method of claim 1, further comprising:

identifying at least one additional currently-in-process process-level input request that comprises a similar hashed-weighted resulting process prioritization; and where assigning the process-level input request to the process category based upon the hashed-weighted resulting process prioritization comprises placing the process-level input request into an active process category associated with the currently-in-process process-level input request.

6. The method of claim 1, where the processing factors associated with the process-level input request comprise attributes obtained from the process-level input request selected from a group consisting of an order due date, a product identifier, a service delivery date, a customer rank, an order amount, a site location, a target channel, a data encoding format, and a file size.

7. The method of claim 1, where the processing factors associated with the historical process performance of similar processes comprises historical processing information selected from a group consisting of past performance of process/workflow, past performance of processing infrastructure, runtime infrastructure metrics, and key performance indicators (KPIs).

* * * * *